July 2, 1957      O. J. HOLMES      2,797,612
INTERMITTENT MOTION PICTURE FILM FEED APPARATUS
Filed March 4, 1950      5 Sheets-Sheet 1
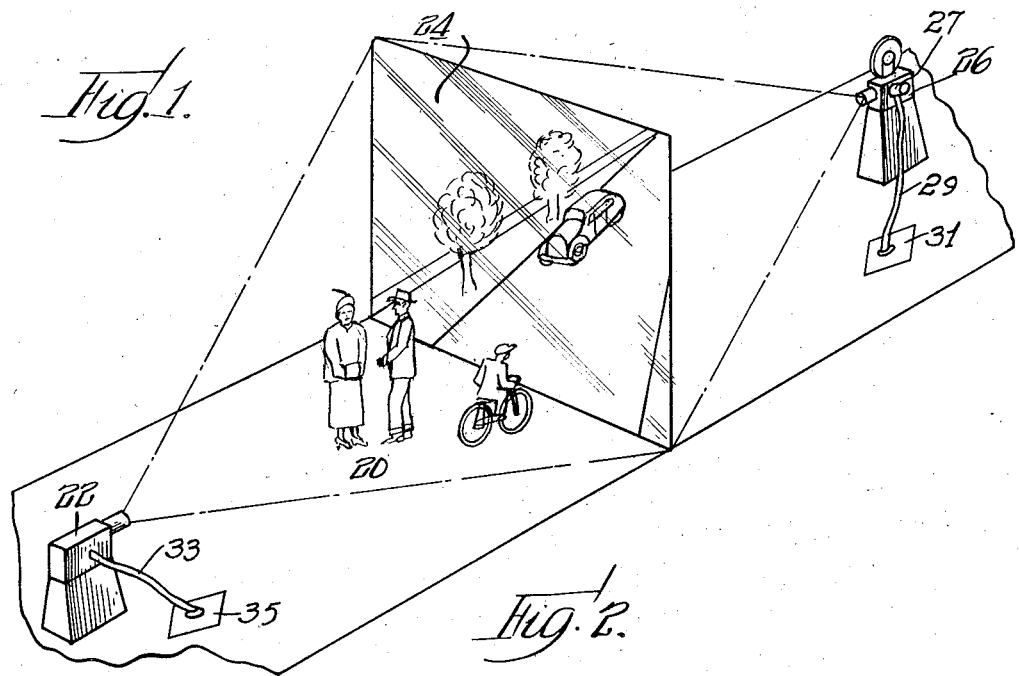
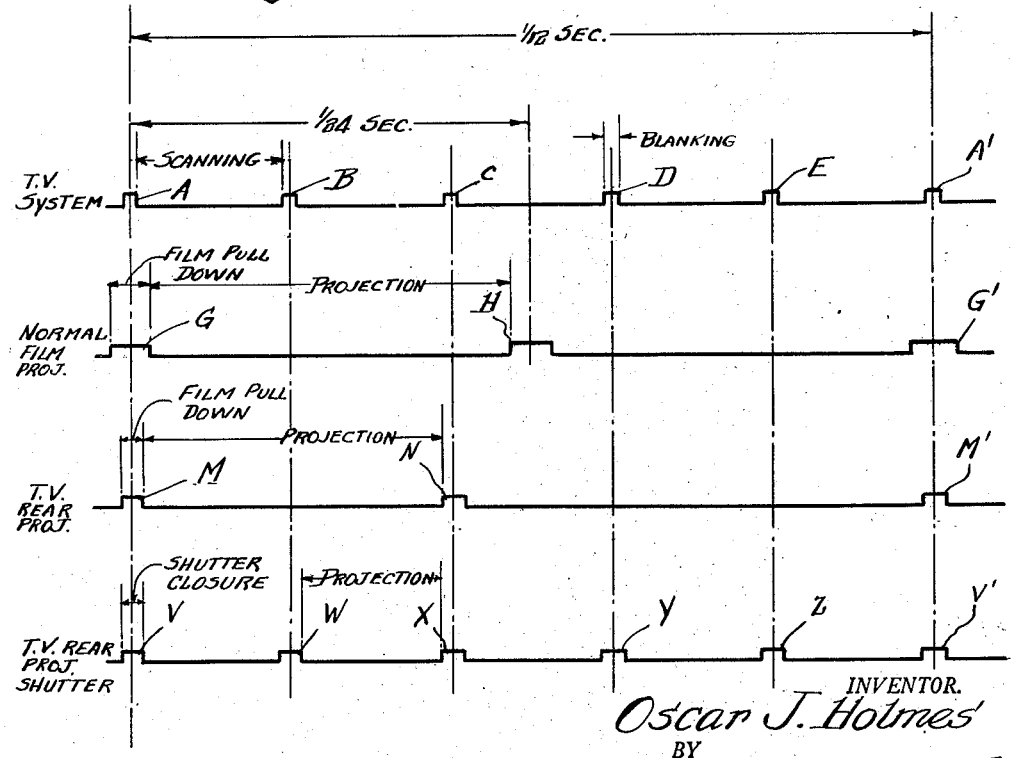
INVENTOR.
Oscar J. Holmes
BY
Moore, Olson & Trexler
attys.

July 2, 1957 O. J. HOLMES 2,797,612
INTERMITTENT MOTION PICTURE FILM FEED APPARATUS
Filed March 4, 1950 5 Sheets-Sheet 2

INVENTOR.
Oscar J. Holmes
BY
Moore, Olson & Trexler
Attys.

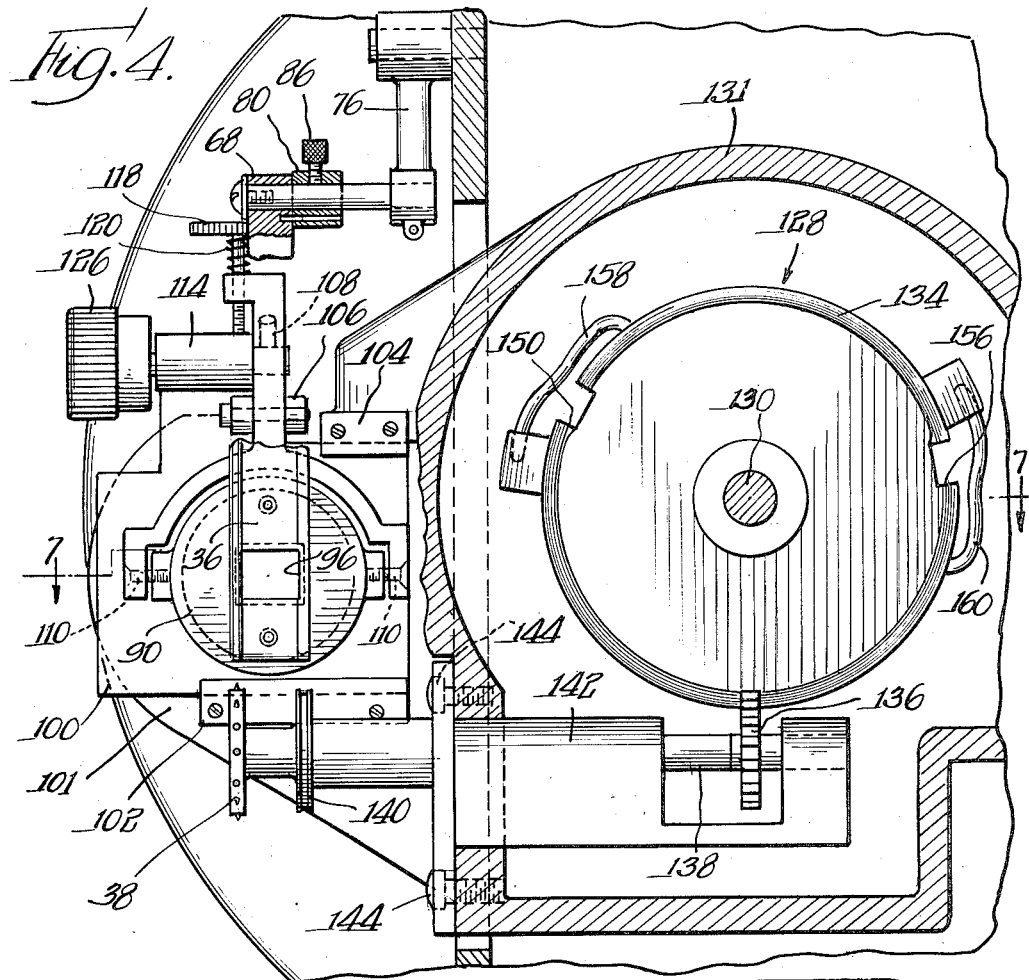
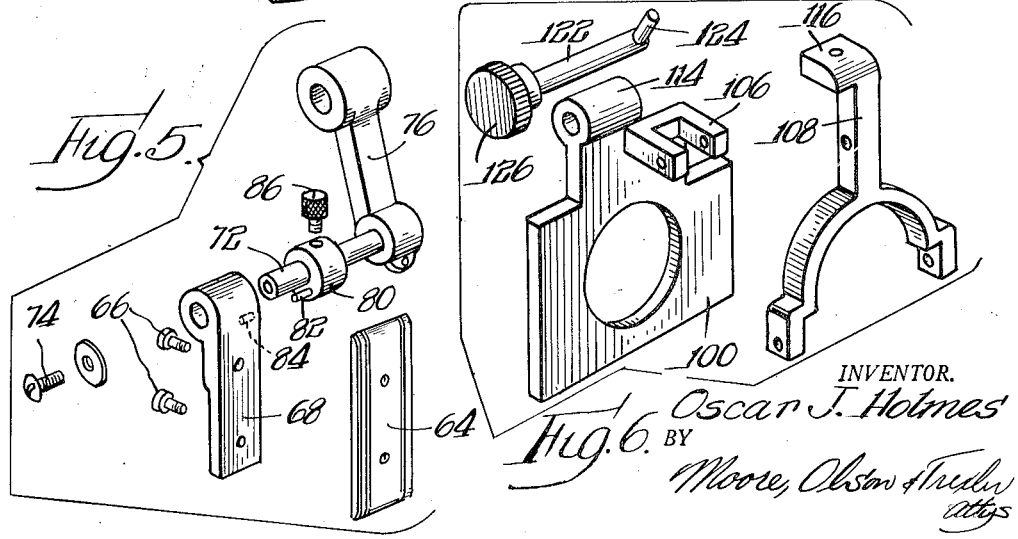

July 2, 1957 O. J. HOLMES 2,797,612
INTERMITTENT MOTION PICTURE FILM FEED APPARATUS
Filed March 4, 1950 5 Sheets-Sheet 4
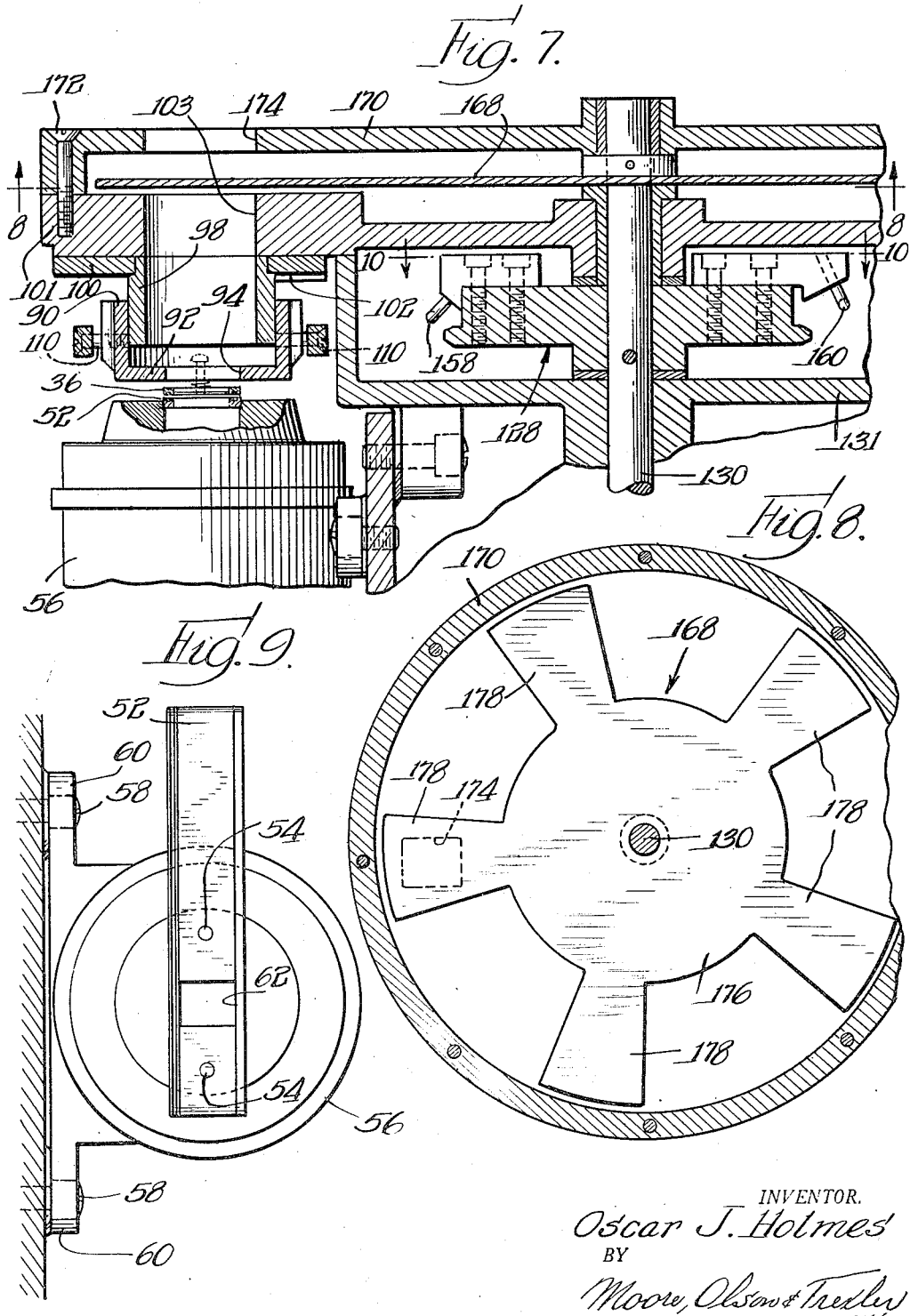
INVENTOR.
Oscar J. Holmes
BY
Moore, Olson & Trexler
Attys.

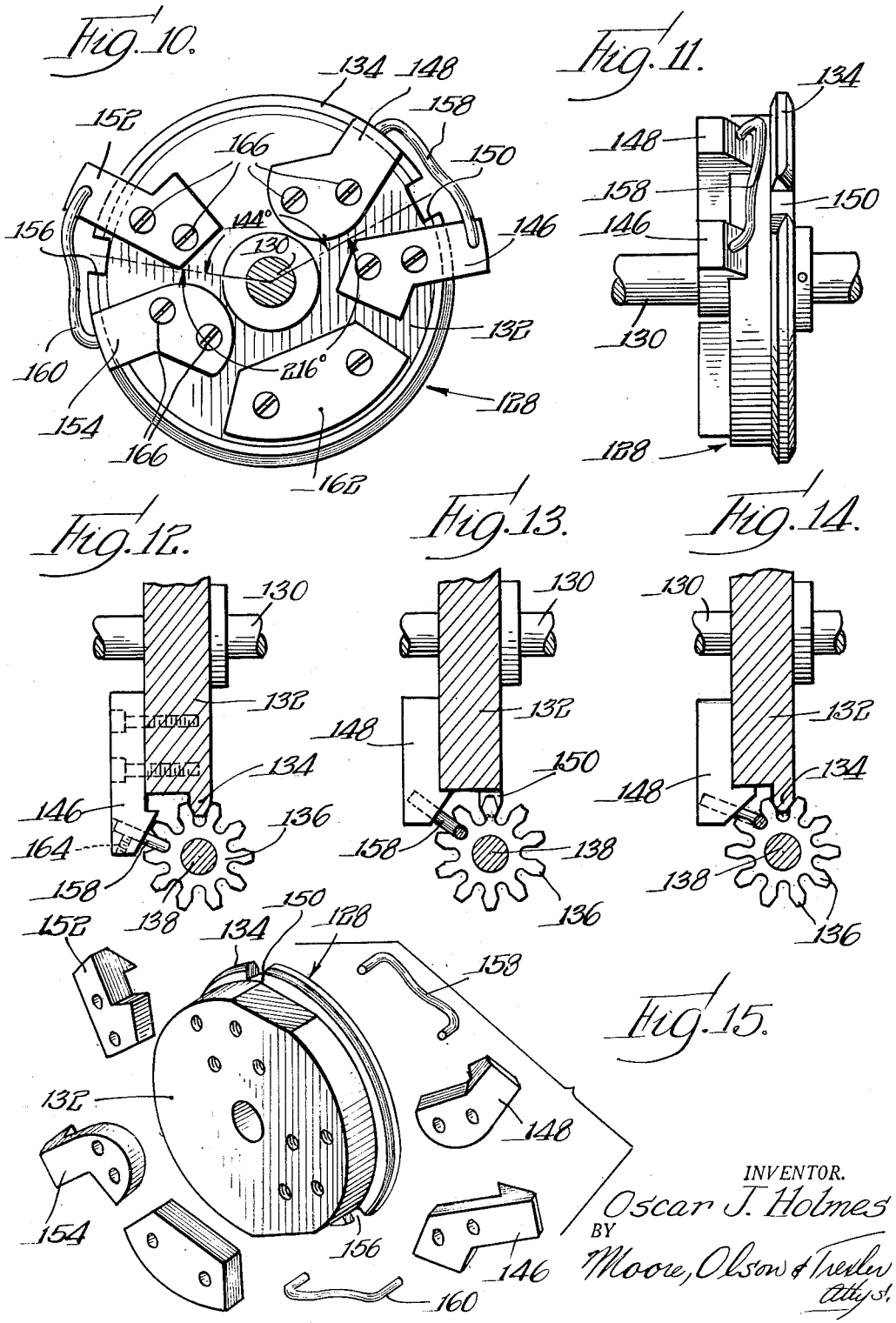

United States Patent Office 2,797,612
Patented July 2, 1957

2,797,612

INTERMITTENT MOTION PICTURE FILM FEED APPARATUS

Oscar J. Holmes, Chicago, Ill.

Application March 4, 1950, Serial No. 147,703

5 Claims. (Cl. 88—18)

This invention relates generally to methods of and apparatus for projecting motion picture film to be televised, and more particularly relates to mechanism for imparting intermittent motion to film being projected.

Television productions are usually originated in the rather restricted space of an indoor studio or sound stage. Due in part to the restricted space and in part to a desire to keep production costs down, large and elaborate backgrounds are impossible. In order to make available a wealth of background material which can be of any desired degree of elaboration and which can be moved at will, it has been proposed to project a background from a motion picture film onto the back of a translucent screen placed directly behind the principal characters of the production. If the film were projected in a normal manner, the projector shutter would close and the film would be advanced during a comparatively long part of a scanning period of the television camera and a noticeable flicker would be introduced.

In televising standard motion picture film, for example, 16 mm. film, directly, various schemes have been devised to make the 24 frame per second film rate compatible with the television 60 field per second rate. This is accomplished by scanning one film frame twice and scanning the succeeding frame three times. In such a device a mechanical shutter is utilized to expose the image orthicon or other television pickup element only during the television blanking interval while the scanning beam is moving from the bottom of one field to the top of the next. The film is moved or pulled down between exposure times while the shutter is interrupting the light rays focused upon the photosensitive surface. As this period is long compared with the exposure time, the pull-down time may be fairly long. This system is presently unusable because of the short time allotted to projecting the background when compared to the total illumination of the foreground on a time basis.

I found first that the problems noted above could be solved by advancing the film through very short intervals encompassing the blanking out periods of the accompanying television pickup element. Later I found that with an extremely short pull-down time comparable to a blanking out interval, specifically of the order of 1/480 of a second, that it is unnecessary to maintain a definite phasing or synchronism between the film movement and blanking out periods so long as the 2:3 ratio between successive film pull-down is maintained. It is thought that the extremely rapid pull-down eliminates flicker by significantly lengthening the exposure time. The increased exposure time allows sufficient total illumination to be delivered to the television camera for satisfactory operation at light intensities which are low enough not to disturb the television camera during the light scanning period. The sudden application of light of too great intensity during the scanning period causes a disturbance in the television system which appears as an objectionable light bar on the receiver screen.

In prior television motion picture projection systems the motion picture projector motor and the television synchronizing generator have been mutually synchronous. The phasing of these two elements of the system could then be accomplished either by electrically phasing the synchronizing generator or revolving the field of the projector motor. Either method added to the expense of the system and made operation tedious.

Although I have found that synchronism is unnecessary and that my projector need not be operated from the same power source as an associated television system, for purposes of development and explanation I have described one form of my invention wherein the projector and television system are synchronized relative to one another.

An object of the present invention is to produce a motion picture film projector which may be used with standard film and with a standard television system to produce a television picture which will have no flicker or extraneous disturbing effects even though the film projector is operating non-synchronously with the television system.

An important object of this invention is the provision of mechanism imparting intermittent movement to a motion picture film for use with a television pickup element with each period of film movement being of extremely short duration and spaced at time intervals bearing successive 2:3 ratios, two film frames being projected for each five scanning intervals of the associated television pickup element.

A specific object of this invention is the provision of intermittent motion mechanism for imparting a pull-down time of substantially 1/480 of a second to 16 mm. motion picture film.

A further object of this invention is the provision of apparatus and methods for projecting background images from a standard motion picture film without phasing the film movement relative to the scanning time or the blanking out period of the television pickup element.

In a particular embodiment within the comprehension of my invention, it is an object of the present invention to produce a motion picture projector in which the pull-down time of film movement and coincident shutter closure time are as short as practicable and are centered about the blanking-out time of an associated television camera.

I have found, as will be brought out in greater detail at a later point, that if the light beam of the projector is interrupted only during the time of film pull-down, the televised image of the scene projected on the background screen flickers when viewed on the television system.

In order to correct this last-named difficulty, it is an object of the present invention to present a motion picture projector having a shutter which interrupts the light beam at equally spaced intervals compatible to both the film system and the television system; there being five interruptions of the light beam for each two film pull-down periods.

These and other objects and advantages of the present invention will be understood from the following description when taken in conjunction with the accompanying drawings in which:

Figure 1 is a perspective view showing my projector in use in a television set such as in a studio in conjunction with a television camera;

Figure 2 represents schematically the relative magnitudes and synchronism of the time intervals involved for a transmission period of five television fields;

Fig. 4 is an enlarged vertical sectional view taken substantially along the line 4—4 in Fig. 3;

Fig. 5 is an exploded perspective view of a film pressure plate mechanism;

Fig. 6 is an exploded view of mounting mechanism for another pressure plate;

Fig. 7 is a horizontal sectional view taken along the line 7—7 in Fig. 4;

Fig. 8 is a vertical sectional view on a reduced scale along the line 8—8 of Fig. 7 showing the shutter mechanism of my projector;

Fig. 9 is a vertical sectional view taken substantially along the line 9—9 in Fig. 3;

Fig. 10 is a vertical sectional view taken substantially along the line 10—10 in Fig. 7 showing a part of my intermittent motion mechanism;

Fig. 11 is a view taken from the right of Fig. 10;

Fig. 12 is a side view of my intermittent motion mechanism at the start of a period of movement;

Fig. 13 is a similar view taken substantially in the middle of such a period of movement;

Fig. 14 is a similar view taken substantially at the end of a period of movement; and Fig. 15 is an exploded perspective view of the parts comprising the part of my intermittent motion mechanism shown in Fig. 10.

Figure 3:
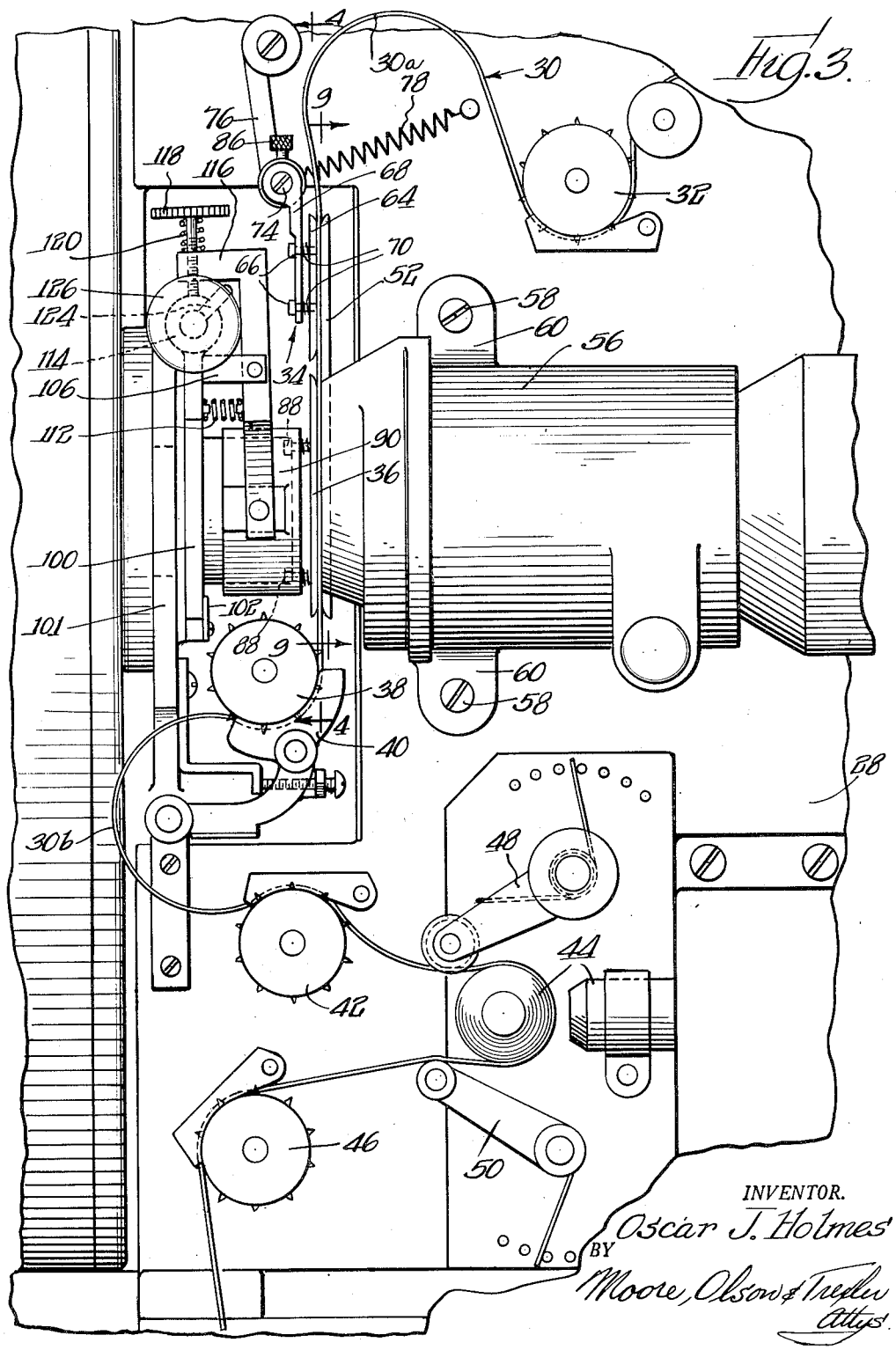
Fig. 3 is a side elevational view of a motion picture projector embodying my invention.

I have shown an application of my invention in Fig. 1 in which various objects or characters 20 are disposed on a television set before a television camera 22 in any suitable location such as a studio. Behind the objects or characters 20 relative to the television camera 22 is placed a translucent screen 24 on which a moving background image is projected from the rear by a motion picture projector 26 embodying the principles of my invention. The image orthicon or other pickup device in the television camera 22 is at all times receiving light from the objects or characters 20 before it; whereas the image projected on the background screen 24 must be intermittent due to the necessity of intermittently moving the film in the projector 26.

The projector 26 is driven by a synchronous motor 27 having a power cord 29 leading to an outlet 31. The television camera 22 is of conventional construction and includes any known or suitable operating circuits including a blanking interval generator. The camera 22 is provided with a power cord 33 leading to an outlet 35 energized from the same power source as the outlet 31. The circuits incorporated in the camera 22 operate, as is usual, in synchronous relation with the energizing power source. Similarly, the synchronous motor 27 of the projector 26 operates in synchronous relation with the power source. The motor 27 is mounted so that the frame of the motor including windings thereon can be rotated or rocked about the axis of the motor. This allows the projector to be brought into any desired phase relationship with the camera 22 including the blanking generator thereof.

In Fig. 2 there is illustrated along the top line the scanning sequence normally utilized in television cameras. During each of the blanking-out periods A, B, C, D, E and A', the scanning beam of the image orthicon or other pickup element is moved from the bottom of one frame or field to the top of the next. During each interval between blanking-out periods, the image impressed on the image orthicon target or iconoscope mosaic is scanned. According to present practice, there are 30 television frames scanned double interlaced as 60 fields in order to reduce flicker effects. For the sake of relative magnitudes, I shall identify the television vertical blanking time as 833 microseconds. The second line of Fig. 2 illustrates the film advance time sequence of a normal motion picture projector. Here the repetition rate is 24 per second rather than 60 per second as in the television system shown in the top line, and it may be seen that if the first period of shutter closure time G is synchronized with the first blanking-out time A, that the second period of shutter closure time H is out of synchronism with succeeding blanking-out times. At the completion of two film projection periods and five television fields, the shutter closure time G' may be seen to be in synchronism with the blanking-out time A'. The shortest film pull-down time and coincident shutter closure time possible with 16 mm. film and conventional pull-down mechanism is $\frac{1}{144}$ part of a second, and the shortest time possible with any prior known mechanism is $\frac{1}{240}$ of a second, as disclosed in my prior Patent 2,116,806 entitled, "Mechanism for Causing Intermittent Film Movement."

In previous television systems in which motion picture film is projected directly onto the pickup target or mosaic, the image is projected on the target or mosaic only during each blanking interval. During the scanning time the projection beam is interrupted by a shutter. The film is moved during certain of those times and as the scanning period is long relative to the blanking interval, the film pull-down need not be very rapid. That adjacent frames are scanned in a 2:3 ratio has been mentioned previously.

In order to obviate the flicker which would appear on the background if the motion picture film were projected in a normal film theater manner, first I propose to close the shutter and pull the film down in phase or synchronism with blanking-out periods, doing so for every second and fifth blanking-out period, referring to Fig. 2, to maintain the necessary speed ratio between the scanning rate and motion picture projection rate. In order to provide a sufficient exposure, it is necessary that the film advance or pull down time and associated shutter closure time should be as short as possible. Accordingly, mechanism is presented in succeeding paragraphs which reduces the previous minimum pull down time of $\frac{1}{240}$ of a second for 16 mm. to $\frac{1}{480}$ of a second. As shown in line 3 of Fig. 2, the pull down times M, N and M' are centered about every second and fifth blanking-out period. With this construction, it was found that the television image appeared to move in and out from the plane of the background screen. I found that this optical effect could be eliminated by interrupting the projected image not only at each pull down time or every second and fifth blanking-out period alternately, but interrupting the projected image during every blanking-out period to provide uniform average illumination over each $\frac{1}{60}$ of a second interval. This is accomplished by a shutter to be disclosed later, and is shown in line 4 of Fig. 2 in which the shutter closure periods are represented by the characters V, W, X, Y, Z and V' which, as may be seen, are of the same duration, $\frac{1}{480}$ of a second, as the film pull down time and are centered about each blanking-out period. As noted heretofore, I subsequently found that with the extremely short pull down time of $\frac{1}{480}$ of a second that phasing of the pull down time and blanking-out period of the television pickup element is unnecessary.

The structure for achieving the desired time relationships as set forth in the foregoing paragraphs is disclosed in Figs. 3–15. A motion picture projector 26 is shown in part in Fig. 3, and comprises a frame or body member 28 carrying the various operative parts. A motion picture film 30 leads from a reel, which is not shown, beneath a feed sprocket 32, and is provided with a suitable loop portion 30a before passing through a pressure plate mechanism generally designated as 34, and past an aperture pressure plate 36 to an intermittently moving sprocket 38 forming a part of the mechanism for imparting intermittent movement, as will be described later. A curved shoe 40 underlies the sprocket 38 to insure that the film shall be engaged by five sprocket teeth at all times to prevent tearing of the film. From this point, the film is provided with another suitable loop portion 30b, after which it passes over a take-up sprocket 42 and around an element of the photoelectric sound reproducing mechanism 44 to a sound sprocket 46 from which the film passes to a take-up reel which is not shown. Adjustable tension elements 48 and 50 carrying rollers at their free ends are provided adjacent the sound pickup elements 44 to maintain the film taut in that vicinity.

It is the general practice to pass film over a sprocket directly above the lens mount of a motion picture projector rather than utilizing the pressure plate mechanism herein described. It was found that with such conventional construction and the extremely rapid pull down time herein utilized that the loop of film directly above such sprocket, being imperfectly flexible, vibrated noisily. Accordingly, the present structure was provided and prevents such flapping or vibration. The pressure plate mechanism comprises in part an aperture plate 52 comprising a somewhat elongated sheet metal member secured as by screws 54 (see Fig. 9) to the lens mount 56, which is in turn secured, as by screws 58 passing through ears 60, to the frame or body 28 of the projector. The aperture plate 52 is mounted vertically and is provided with a framing aperture 62 centered about the optical axis of the lens system. To maintain the film flat against the aperture plate 52, a pressure plate 64 is provided as may be seen in Figs. 3 and 5. The pressure plate 64 is secured by headed screws 66 threaded into the pressure plate to an arm 68 through which the screws fit loosely. Coil springs 70 are interposed between the pressure plate 64 and arm 68 encircling the screws 66 to force the pressure plate 64 away from the arm 68 and against the film 30. The arm 68 is in turn pivotally mounted on a shaft 72 and may be secured against axial movement therefrom by any desirable means such as a screw 74 threaded into the end of the shaft 72. The shaft 72 is carried by the lower extremity of an arm 76 which is pivotally mounted on the projector frame or body 28 and is urged toward the film by a tension spring 78 secured to the lower end of the arm 76 and to a fixed point on the frame 28. A collar 80 fits over the shaft 72 and is provided with an extending pin 82 which cooperates with an aperture 84 in the arm 68. The collar 80 is radially apertured and is provided with a set screw 86 threaded therein so that the collar 80 and arm 68 may be rotated about the shaft 72 or shifted axially thereof in order to maintain the pressure plate 64 parallel to the aperture plate 52 and in contact with the film. The spring 78 may be stretched readily to move the pressure plate 64 forwardly in order to position a film between it and the aperture plate 52, and both the spring 78 and the springs 70 maintain the pressure plate resiliently in contact with the film.

The film 30 is maintained flat against the aperture plate 52 in the vicinity of the framing aperture 62 by means of the aperture pressure plate 36. The aperture pressure plate is supported, as may be seen in Fig. 3, by screws 88 from a cylindrical member 90 which is best seen in Figs. 3 and 7. The cylindrical member 90 is provided with a front face 92 having an aperture 94 similar in shape to and aligned with the framing aperture 62 of the aperture plate and a substantially identical aperture 96 (see Fig. 4) in the aperture pressure plate 36. Small springs are placed about the screws 88 to move the aperture pressure plate from the cylindrical member 90 and resiliently against the film 30 in a fashion similar to that described with regard to the pressure plate 64. The cylindrical member 90 is slidably and concentrically mounted about a tubular member 98 secured to or formed integrally with a mounting plate 100 (Figs. 3, 4 and 7). The mounting plate 100 is secured to a transversely extending vertical wall 101 of the projector by plates 102 and 104 secured to the wall 101 and overlying the lower and upper edges, respectively, of the plate 100 so that the plate may be slid laterally in and out of position. When in position, the inner bore of the tubular member 98 is aligned with an aperture 103 in the wall 101. The mounting plate 100 is provided with a bifurcated bracket 106 which is best seen in Fig. 6. A substantially fork-shaped bifurcated arm 108 is pivotally mounted between the ears of the bracket 106 and pivotally carries the cylindrical member 90 between the tines at its lower end by some means such as screws 110 (Figs. 4 and 7). As may be seen in Fig. 3, a compression spring 112 or other resilient member is mounted between the bifurcated arm 108 and the mounting plate 100 to force the cylindrical member 90 toward the aperture plate 52 to maintain the aperture pressure plate 36 resiliently against the film. A substantially tubular bearing member 114 is carried atop the mounting plate 100 and may be integral therewith. The upper end of the bifurcated arm 108 extends rearwardly at 116 to impart an L-shape to the arm, and through the portion 116 is threaded a screw 118 to abut against the outside of the tubular bearing member 114 to limit the movement of the cylindrical member 90. A spring 120 may be located about the shank of the screw 118 and abutting the head of the screw to bind the threads of the screw against the threads in the extending portion 116 of the bifurcated arm 108 to prevent accidental movement of the screw. A shaft 122 having a radially extending pin 124 and a knurled head 126 fits within the bearing member 114. When it is desired to thread film onto the projector between the aperture pressure plate 36 and aperture plate 52, it is only necessary to turn the knob 126 slightly clockwise, as seen in Fig. 3, to cause the pin 124 to abut against the arm 108 above its pivot point, which causes the arm to pivot and retract and cylindrical member 90 and aperture pressure plate 36. The remainder of the projector may be conventional except for the intermittent motion mechanism and associated shutter mechanism now to be described.

The intermittent motion mechanism comprises in addition to the sprocket wheel 38 previously mentioned, a cam member 128 carried within a housing 131 (Figs. 4 and 7) secured to the vertical transverse wall 101 of the projector in any desired manner. The cam member 128 is secured to a rotating shaft 130 which may be driven in any convenient manner by an electric motor which is not shown. The cam member 128, as may be seen best in Figs. 10 and 11, comprises a substantially cylindrical body portion 132 having a discontinuous peripheral rim 134 which I prefer to call a dwell member. The dwell member cooperates with a star member 136 throughout most of the rotation of the cam member 128 to maintain the star mechanism in fixed position. The star mechanism is secured to the shaft 138 which carries the intermittent sprocket 38 including the roller 140. The shaft 138 is carried by a bracket 142 which is secured by any desirable means such as screws 144 to a portion of the housing 131. Returning to Figs. 7, 10, 11 and 15, the cam member 128 will be seen to include supports 146 and 148 spaced to each side of a discontinuity 150 in the dwell member or rim 134 and support members 152 and 154 spaced to either side of a second discontinuity 156 in the dwell member or rim 134. Between the supports 146 and 148 there extends a hardened wire cam 158, and between the pair of supports 152 and 154 there extends a second hardened wire cam 160, the term "wire" in each case being intended in its broadest sense. A counterweight 162 is provided to compensate for the weight of the supports and cams to preclude vibration.

As may be seen in Figs. 12–14, the dwell member 134 fits between a pair of adjacent teeth on the star member 136 to prevent rotation of the star member throughout most of the period of rotation of the cam member 128. As the cam member 128 rotates, the leading edge of one of the cams, as for instance 158, engages the space between a pair of adjacent teeth on the star member 136 as seen in Fig. 12. The wire cam 158 runs at first substantially parallel to the rim or dwell member 134, but is offset rather sharply in the vicinity of the discontinuity 150 of the dwell member so as to cause the star member to rotate very rapidly through the discontinuity as may be seen in Fig. 13. This partial rotation causes the sprocket 38 to move in a similar fashion and pull the film down a distance of one frame in 1/480 of a second. Following the discontinuity, the cam again becomes substantially parallel to the dwell member 134, and the dwell member engages between a pair of adjacent teeth of the star member, as may be seen in Fig. 14, to prevent rotation of the star member until the following cam and dwell member discontinuity are encountered, at which time the film is again pulled down one frame in 1/480 of a second. The shape of each cam 158, 160 is such as to start the film movement comparatively slowly so as to avoid tearing of the film by the teeth of the sprocket 38 and to accelerate the movement rapidly to a maximum and then slow it down to a comparatively slow stop. The wire cams may be carried by the supports by having the ends extend within apertures in the supports, and may be secured as by set screws 164 as shown in Fig. 12. The supports are in turn secured to the cylindrical body portion of the cam member 128 by means such as screws 166, and may be adjustably mounted if desired to obtain optimum speed and motion characteristics.

The cams 158 and 160 and associated discontinuities 150 and 156 in the dwell member are spaced so that the smaller arc between their centers is 144° while the larger arc is 216° to attain the film movement characteristic illustrated in line 3 of Fig. 2, that is, so that alternate frames will be projected in a 2:3 ratio. In a specific projector actually embodying this mechanism, the cam member 128 is driven at 720 R. P. M., has a diameter of 3¼", and the discontinuities in the dwell member 134 and corresponding active portions of the wire cams 158, 160 are each slightly less than 10° to pull the film down one frame in 1/480 of a second.

In contradistinction, the actuating mechanism in my prior Patent No. 2,117,806 included a cam member which operated at 1440 R. P. M., had a diameter of 2½2", and had a single wire cam having an active portion of 36°. Many problems had to be solved in developing the present cam member. The cam member shown in my aforesaid prior patent was too small to accommodate more than one wire cam. The mere enlarging of the prior cam member and the addition of a second wire cam would not have sufficed as the proper time relationships had to be achieved. The wire cams and associated discontinuities in the dwell members had to be spaced at 144° along the shorter arc and the active portion of the wire cams had to be made quite short in order to accomplish a 36° movement of the star mechanism in 1/480 of a second. Thus, the cam member of the instant invention presents features not found in the cam member of my prior patent which I have referred to including the size, the rotative speed, the number of wire cams, the angular placement of the wire cams, and the arcuate extent of the active part of each cam and corresponding discontinuity in the dwell member.

In order to interrupt the light beam once for each blanking interval, there is provided in this projector a shutter 168, seen in Figs. 7 and 8, rotatably carried by the shaft 130, which drives the cam member 128. The shutter is housed within a housing 170 secured in any suitable manner, as by screws 172, to the vertical transverse projector wall 101. The housing is apertured at 174 in alignment with the aperture 103 in the wall 101 and with the apertures 96 and 66 of the aperture pressure plate and aperture plate, respectively, along the optical axis of the lens system. The shutter 168 comprises a central disk portion 176 which at all times lies to one side of the aperture 174 and has a number of radially extending arms to interrupt the light at intervals bearing an integral relation to the field rate. In the present instance there are five such arms so as to interrupt the light once for each blanking-out period of the television system.

It is apparent that I have herein shown methods of producing a flickerless background for a television production by projecting a motion picture film on a background screen and interrupting the projection once for each blanking-out period of the television pickup element while pulling the film down one frame in 1/480 of a second during certain of the interrupted intervals. Apparatus for carrying out the methods has been disclosed and includes a motion picture projector which projects an image onto a translucent screen from the rear to provide a background for a scene being televised. The projector maintains the scene substantially constantly upon the screen as the film is pulled down and the projector light beam is interrupted for such an extremely short period, specifically 1/480 of a second, that all flicker of the image on the background screen is eliminated without the necessity of phasing the projector relative to the television pickup element with the exception of the usual 2:3 ratio of successive frame projection times. I have further found that with the 1/480 of a second film pull-down time motion picture film can be televised directly with the same lack of phasing or synchronism. In order to accomplish this, new and improved film feeding mechanism and shutter means have been shown and described.

Although a single preferred form of my invention has been shown and described, it is to be understood that this is for illustrative purposes only and that I intend my invention to be limited only by the spirit and scope of the appended claims.

I claim:

1. In apparatus for feeding motion picture film, a mechanism comprising rotary film driving means and actuating means driven at a substantially constant speed for imparting intermittent movement to said rotary driving means, said actuating means comprising a rotary member, a plurality of wire cam members carried by said rotary member and successively engaging said rotary film driving means, and a plurality of elements mounted on an end of said rotary member and carrying said wire cam members, said wire cam members being unsymmetrically spaced on said rotary member to operate said rotary film driving member at unequal intervals.

2. In apparatus for feeding motion picture film, a mechanism comprising substantially star-shaped rotary film driving means and actuating means driven at a substantially constant speed for imparting intermittent movement to said rotary driving means, said actuating means comprising a rotary member having peripherally disposed discontinuous dwell means extending substantially radially outwardly from the periphery of said rotary member and a plurality of cam members carried by said rotary member outwardly of said periphery and successively engaging said rotary film driving means, said cam members being unsymmetrically spaced on said rotary member by members disposed on an axial end of said rotary member to operate said rotary film driving member at unequal intervals and said dwell means precluding movement of said rotary member at other times.

3. In apparatus for feeding motion picture film, film framing means including resilient means for maintaining the film flat, normally accessible means for manually withdrawing said resilient means, means for intermittently advancing said film rapidly past said framing means, and means engaging both sides of said film prior to movement past said framing means to preclude flutter of said film caused by rapid movement thereof, said last named means including pressure means separate from the resilient means of said film framing means, and normally accessible means for manually withdrawing said pressure means.

4. In apparatus for feeding motion picture film, film framing means including resilient means for maintaining the film flat, means for intermittently advancing said film rapidly past said framing means, pressure plate means including a shiftable part separate from said film framing means for resiliently engaging both sides of said film prior to movement past said framing means to preclude flutter of said film caused by rapid movement thereof, and means mounting said shiftable part for independently shifting said shiftable part, said shiftable part being normally accessible for independent shifting.

5. In apparatus for feeding motion picture film, film framing means including resilient pressure plate means for maintaining the film flat, normally accessible lever means for retracting said pressure plate means, means for intermittently advancing said film rapidly past said framing means, and means engaging both sides of said film prior to movement past said framing means to preclude flutter of said film caused by rapid movement thereof, said last named means including a shiftable pressure plate separate from the pressure plate means of said film framing means, a pivotal mount for said last named means and spring means holding said last named means resiliently in operating position, said shiftable pressure plate normally being shiftable independently of said resilient pressure plate means.

References Cited in the file of this patent

UNITED STATES PATENTS

| Number | Name | Date |
|---|---|---|
| 560,424 | Petit | May 19, 1896 |
| 1,833,339 | Seufert | Nov. 24, 1931 |
| 1,920,969 | Carpenter | Aug. 8, 1933 |
| 2,022,505 | Hartley | Nov. 26, 1935 |
| 2,027,028 | Douden | Jan. 7, 1936 |
| 2,027,520 | Diebel | Jan. 14, 1936 |
| 2,047,983 | Richards | July 21, 1936 |
| 2,048,194 | Moreno | July 21, 1936 |
| 2,049,897 | Donle | Aug. 4, 1936 |
| 2,073,370 | Goldsmith | Mar. 9, 1937 |
| 2,082,093 | Bedford | June 1, 1937 |
| 2,117,806 | Holmes | May 17, 1938 |
| 2,260,299 | Cunningham | Oct. 28, 1941 |
| 2,312,308 | Boecking | Mar. 2, 1943 |
| 2,415,390 | Konkle | Feb. 4, 1947 |
| 2,457,915 | Nemeth | Jan. 4, 1949 |
| 2,500,358 | Jedeka | Mar. 14, 1950 |
| 2,584,265 | Gillette | Feb. 5, 1953 |